H. G. RICHARDS.
Ditching and Tile-Laying Machines.
No. 149,337. Patented April 7, 1874.
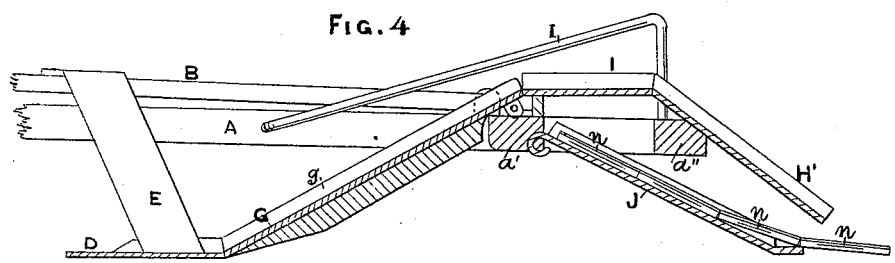
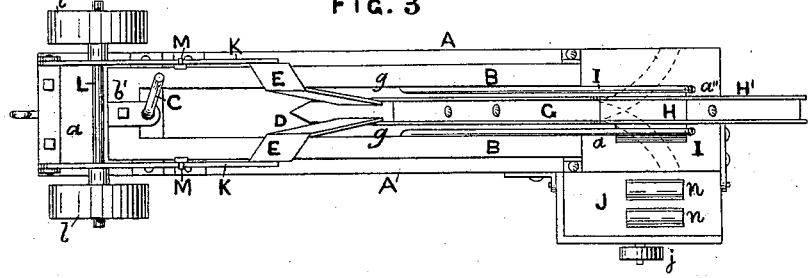
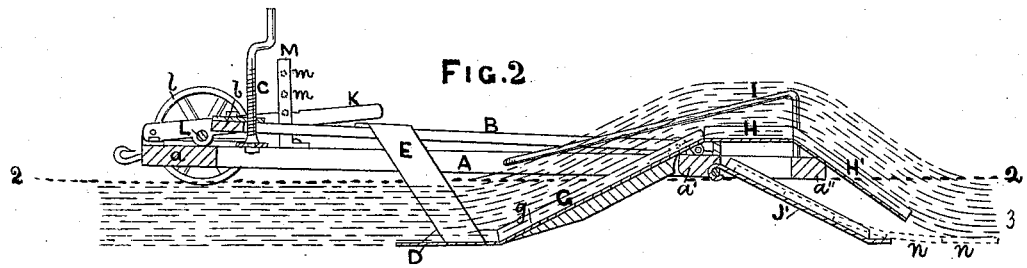
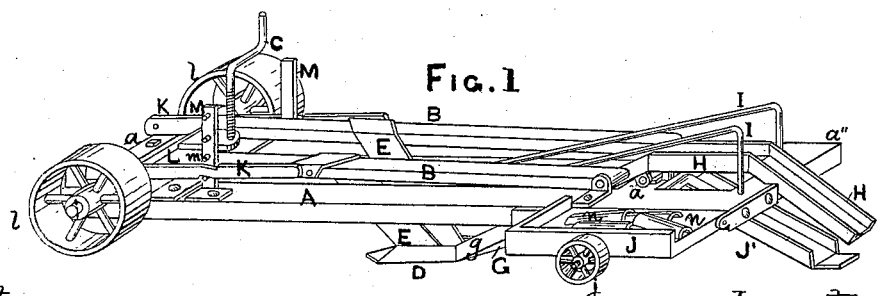

UNITED STATES PATENT OFFICE.

HENRY G. RICHARDS, OF GALESBURG, ILLINOIS.

IMPROVEMENT IN DITCHING AND TILE-LAYING MACHINES.

Specification forming part of Letters Patent No. 149,337, dated April 7, 1874; application filed February 7, 1874.

*To all whom it may concern:*

Be it known that I, HENRY G. RICHARDS, of Galesburg, county of Knox and State of Illinois, have invented certain new and useful Improvements in Combined Ditching and Tile-Laying Machines; and I do hereby declare the following to be a full, clear, and exact description of the construction and operation of the same, reference being had to the accompanying drawing, making part of this specification, in which—

Figure 1 is a perspective view of my invention; Fig. 2, a vertical central longitudinal sectional view of Fig. 1; Fig. 3, a top plan or view of Fig. 1; and Fig. 4 is an enlarged view of the rear part of Fig. 2.

This invention relates to an improved machine for cutting wet-land drains or ditches, and for laying and covering drain-tile within the same; and the invention consists in suspending the main parts of the cutting and elevating devices from an upper frame, which is pivoted at one end to the main frame, and suitable devices provided at its other end for regulating the depth of cut, said frames being provided with vertical side cutters and a bottom cutter, and an elevating and carrying device, by means of which the earth is raised above the surface, leaving a space for the deposit of the tiles, and then dropped or redeposited in the opening after the tiles are laid, all as hereinafter fully described.

Referring to the parts by letters, letters A A represent the side pieces of the main frame, connected by transverse bars $a$ $a'$ $a''$; B B, the side bars of the frame, carrying the excavating and elevating devices, connected at their forward ends by a transverse bar, $b$, and hinged at their rear ends to the frame-pieces A A near the bar $a'$. C is a bolt, with a crank at its upper end, its central part threaded and passing through the bar $b$, or through a plate projecting therefrom, and its lower end resting on the bar $a$, or on a transverse bar near it. D is the bottom cutter, formed, as shown in the drawings, of a pointed bottom plate, with flanged sides, and suspended and braced from the frame-pieces B B by the side cutter-plates E E. G is the elevator, consisting of a bottom plate, with flanges $g$ $g$ on its sides, and extending from the rear end of the bottom plate or cutter G, to which it is connected, upward in a favorable incline for the ascent of the excavated dirt to the bar $a'$, or a little above it. H is a dirt-carrier, corresponding in its cross-section with the elevator G, somewhat elevated above the frame-pieces A, and extending to or near the rear side of the bar $a''$, where it connects with a similar-shaped carrier, H', extending downward and rearward. I I are guards, extending upward from the frame-pieces A A, at the sides of dirt-carriers G and H. J is the tile-carrier, hinged to the main frame A at one side, and opposite to the opening through them between the bars $a'$ $a''$, its outer side supported by a wheel, $j$. K K are levers, one of which is pivoted at its forward end to each of the frame-pieces A A. L is an axle, having bearings in the levers K near their pivoted ends, and provided near its ends with wheels $l$ $l$. M M are standards, secured to and projecting upward from the frame-pieces A A, and having projecting pins $m$ $m$ $m$ $m$, between any two of which the rear parts of the levers K K may be rested. J' is the tile-layer.

The operations of my invention are deemed obvious to any one skilled in the art. The main frame A, in operation, rests upon the surface of the ground, (shown at Fig. 2 by the dotted line 2 2,) except as it is raised or lowered at its front ends by the wheels $l$ $l$, being lowered or raised, respectively, by means of the levers K being adjusted vertically between the pins $m$ $m$ $m$ $m$, to regulate, partially, the depth of running, and to facilitate cutting a level ditch in ground with an irregular surface. The sides of the ditch are cut by the side cutters E E, and the bottom by the sole plate or cutter D, and the excavated dirt, sliding upward on the carrier G, will be received by the carriers H H' and redeposited in the open ditch in rear of the bar $a''$, as shown by the series of dotted lines 3 3 at Fig. 2. The drain-tile, some of which are shown in the different drawings by letters $n$ $n$, are carried on the table J, and may be passed, during the passage of the machine, one at a time, onto the tile-layer J', where, sliding downward, they will be deposited end to end in the bottom of the ditch prior to the redeposit of the dirt, as hereinbefore described, and consequently receive the dirt above to cover them and close up the ditch. The front end of the frame-pieces B B may be raised or lowered by the screw C, to regulate fully the depth of cut, to regulate the level bottom on irregular-surfaced ground, and to throw the cutter up enough to run it up out of the ground when desired. Mold-boards may be attached at the rear end of the elevator, as shown by dotted lines at Fig. 3, to throw the excavated dirt to the right or left hand and outside of the ditch when desired.

I claim as my invention—

The adjustable frame B, pivoted to the drag-frame A, and provided with the cutters D E E and elevator G, arranged and operating substantially as and for the purpose specified.

HENRY G. RICHARDS.

Witnesses:
J. J. TUNNICLIFF,
OLOF HAWKINSON.